US008711797B2

(12) United States Patent
Kim et al.

(10) Patent No.: US 8,711,797 B2
(45) Date of Patent: Apr. 29, 2014

(54) METHOD AND APPARATUS FOR TRANSMITTING AND RECEIVING EXTENSION INFORMATION OF COMPONENT CARRIER IN WIRELESS COMMUNICATION SYSTEM

(75) Inventors: Kitae Kim, Suwon-si (KR); Kibum Kwon, Ansan-si (KR)

(73) Assignee: Pantech Co., Ltd., Seoul (KR)

( * ) Notice: Subject to any disclaimer, the term of this patent is extended or adjusted under 35 U.S.C. 154(b) by 92 days.

(21) Appl. No.: 13/521,432

(22) PCT Filed: Jan. 7, 2011

(86) PCT No.: PCT/KR2011/000105
§ 371 (c)(1),
(2), (4) Date: Jul. 10, 2012

(87) PCT Pub. No.: WO2011/087237
PCT Pub. Date: Jul. 21, 2011

(65) Prior Publication Data
US 2012/0320843 A1 Dec. 20, 2012

(30) Foreign Application Priority Data
Jan. 12, 2010 (KR) .......................... 10-2010-0002495

(51) Int. Cl.
*H04W 4/00* (2009.01)
*H04B 7/00* (2006.01)
*H04J 4/00* (2006.01)
*H04J 3/16* (2006.01)
*H04W 72/04* (2009.01)

(52) U.S. Cl.
CPC .................................... *H04W 72/04* (2013.01)
USPC ........... 370/329; 370/277; 370/436; 370/437; 370/478

(58) Field of Classification Search
CPC ...... H04W 72/04; H04W 88/08; H04W 76/00
USPC ............................................. 370/329
See application file for complete search history.

(56) References Cited

U.S. PATENT DOCUMENTS

| | | | |
|---|---|---|---|
| 2010/0172235 A1* | 7/2010 | Liu et al. ........................ | 370/208 |
| 2010/0260081 A1 | 10/2010 | Damnjanovic et al. | |
| 2011/0077015 A1* | 3/2011 | Saily et al. .................... | 455/450 |
| 2011/0274066 A1* | 11/2011 | Tee et al. ....................... | 370/329 |
| 2011/0305134 A1* | 12/2011 | Chung et al. .................. | 370/216 |
| 2011/0305185 A1* | 12/2011 | Kwon et al. ................... | 370/312 |

OTHER PUBLICATIONS

Qualcomm Europe, "Notions of segment and non-backward compatible carriers for LTE-A," 3GPP TSG RAN WG1 #58 R1-093119, Aug. 24-28, 2009.
Panasonic et al., "Possible definition of extension carrier and segment," 3GPP TSG-RAN WG1 Meeting #59 R1-094499, Nov. 9-13, 2009.
International Search Report issued for related International Patent Application No. PCT/KR2011/000105 dated Sep. 8, 2011.

* cited by examiner

*Primary Examiner* — John Blanton
*Assistant Examiner* — Abu-Sayeed Haque
(74) *Attorney, Agent, or Firm* — H.C. Park & Associates, PLC

(57) ABSTRACT

A base station comprises: an area information generation unit which generates information for a determined second area by determining an additional assignment of the second area different from a first area to a component carrier (CC) of the first area having a bandwidth smaller than a bandwidth of a maximum assignable CC; a mapping control unit which controls an assignment of a reference signal to a frequency band including the first and second area by generating the reference signal for channel estimation in the first and second areas; a signal generation unit which generates the information for the second area and the reference signal as a wireless signal; and a transmission unit for transmitting the generated wireless signal and is characterized by transmitting data to a user terminal and receiving the data from the user terminal by assigning the resources to the first and second areas.

24 Claims, 12 Drawing Sheets

METHOD AND APPARATUS FOR TRANSMITTING AND RECEIVING EXTENSION INFORMATION OF COMPONENT CARRIER IN WIRELESS COMMUNICATION SYSTEM

CROSS-REFERENCE TO RELATED APPLICATION

This application claims is the National Stage Entry of International Application No. PCT/KR2011/000105, filed on Jan. 7, 2011, and claims priority from and the benefit of Korean Patent Application No. 10-2010-0002495, filed on Jan. 12, 2010, both of which are incorporated herein by reference for all purposes as if fully set forth herein.

BACKGROUND

1. Field

The present disclosure relates to a method and apparatus for transmitting and receiving information associated with an extended service region for a predetermined component carrier (CC) from among a plurality of CCs in a wireless communication system.

2. Discussion of the Background

Essential technologies associated with data transmission in a wireless communication system have been discussed, and particularly, an effective use of limited radio resources is the one of the main issues.

Therefore, a next generation wireless communication system proposes a technology that satisfies service requirements through use of the plurality of CCs. For example, to secure a broadband bandwidth to satisfy the demand for a higher data transmission rate, scattered bands may be designed to satisfy basic requirements so that the scattered bands operate as independent systems, respectively, and carrier aggregation (CA) that binds a plurality of bands into a single system may be introduced.

However, detailed technologies have not yet been adopted, and the wireless communication system requires a technology of using a CC to satisfy service requirements.

SUMMARY

Therefore, the present invention has been made in view of the above-mentioned problems, and an aspect of the present invention is to provide a method and apparatus for using flexible frequency resources in a wireless communication system.

Another aspect of the present invention is to provide a method and apparatus for receiving information associated with an extended service region is corresponding to a component carrier (CC) in a wireless communication system.

Another aspect of the present invention is to provide a method and apparatus for informing a CC of the use of a contiguous region in a wireless communication system.

Another aspect of the present invention is to provide a method and apparatus for transceiving information associated with available regions in a wireless communication system.

Another aspect of the present invention is to provide a method and apparatus for generating a sequence associated with available regions in a wireless communication system.

Another aspect of the present invention is to provide a method and apparatus for resource allocation that secures quality of service data in a wireless communication system.

Another aspect of the present invention is to provide a method and apparatus for using unused frequency band to improve efficiency in using resources of a system in the communication system using a plurality of CCs.

Another aspect of the present invention is to provide a method and apparatus for flexibly setting extensible regions in a wireless communication system by taking into consideration a circumstance in which a CC is used, and maximizing efficiency in using wireless resources.

In accordance with an aspect of the present invention, there is provided a base station (BS), including: a region information generation unit to determine additional assignment of a second region different from a first region to a component carrier (CC) of is the first region having a bandwidth narrower than a maximum assignable bandwidth of a CC, and to generate information associated with the second region; a mapping control unit to generate a reference signal to be used for channel estimation in the first region and the second region, and to control the reference signal to be assigned to a frequency band including the first region and the second region; a signal generation unit to generate the information associated with the second region and the reference signal assigned by the mapping control unit to be a wireless signal; and a transmission unit to transmit the generated wireless signal, and the BS allocates resources to the first region and the second region so as to perform transmission and reception of data with a user equipment (UE).

In accordance with another aspect of the present invention, there is provided a method of transmitting extension information of a CC, the method including: determining additional assignment of a second region that is different from a first region to a CC of the first region having a bandwidth narrower than a maximum assignable bandwidth of a CC; generating and transmitting information associated with the second region; generating a reference signal to be used for channel estimation in the first region and the second region, and transmitting the reference signal by assigning the reference signal to a frequency band including the first region and the second region; and performing transmission and reception of data with a UE by allocating resources to the first region and the second region.

In accordance with another aspect of the present invention, there is provided a UE, including: a reception unit to receive, from a BS through a dedicated signal, information associated with a second region different from a CC of a first region is having a bandwidth narrower than a maximum assignable bandwidth of a CC, and to receive a signal to which a reference signal for channel estimation in the first region and the second region is assigned; a transmission unit to transmit data to the BS; a storage unit to store received information associated with the second region; and a control unit to control the storage unit to store the information associated with the second region in the storage unit, and to control the transmission unit and the reception unit to perform transmission and reception of data with the BS by receiving allocation of resources in the first region and the second region.

In accordance with another aspect of the present invention, there is provided a method of receiving extension information of a CC, the method including: receiving, from a BS through a dedicated signal, information associated with a second region different from a CC of a first region having a bandwidth narrower than a maximum assignable bandwidth of a CC; receiving a signal to which a reference signal for channel estimation in the first region and the second region is assigned; and performing transmission and reception of data with the BS by receiving allocation of resources in the first region and the second region.

DETAILED DESCRIPTION OF THE ILLUSTRATED EMBODIMENTS

Figure 1:
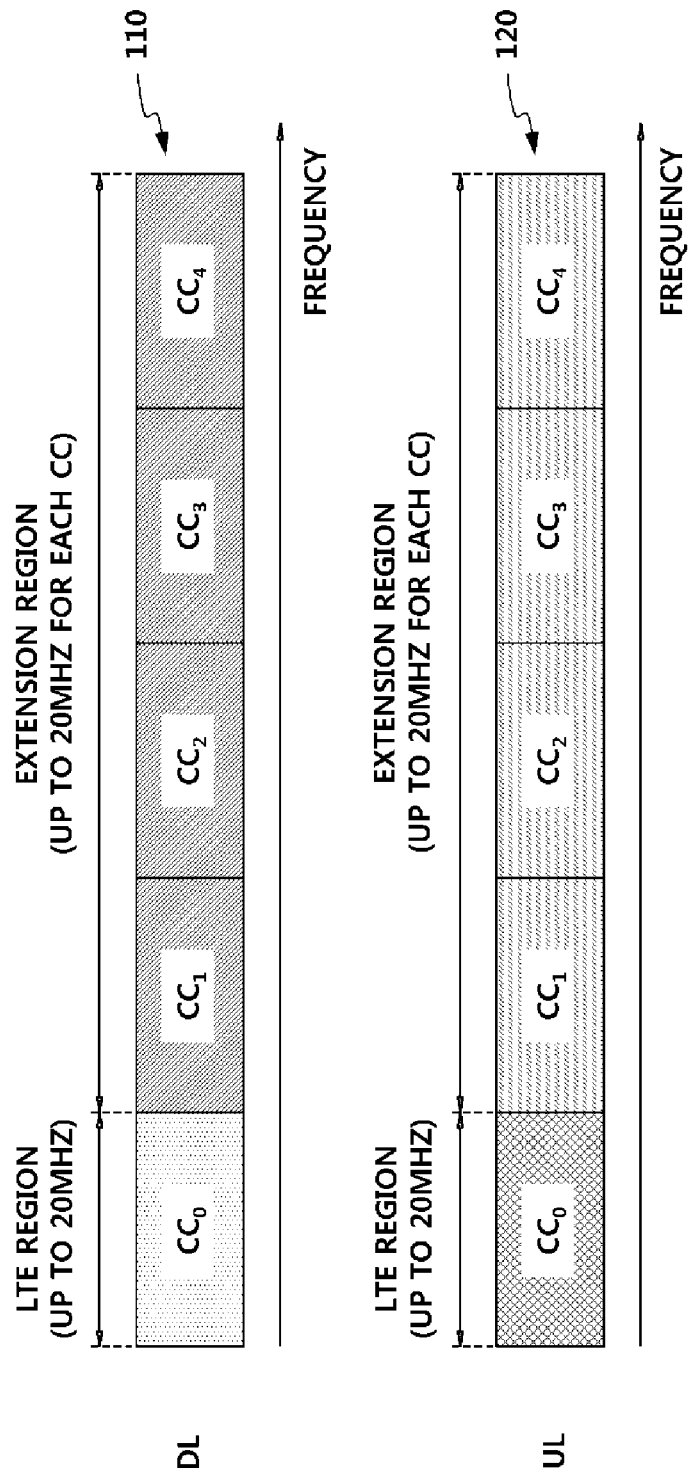
FIG. 1 is a diagram illustrating a plurality of component carriers (CCs) according to an embodiment of the present invention.

Hereinafter, exemplary embodiments of the present invention will be described with reference to the accompanying drawings. In the following description, the same elements will be designated by the same reference numerals although they are shown in different drawings. Further, in the following description of the present invention, a detailed description of known functions and configurations incorporated herein will be omitted when it may make the subject matter of the present invention rather unclear.

Also, embodiments of the present invention will be described based on a wireless communication network, and operations in the wireless communication network may be performed in a process in which a system that manages the wireless communication network, for example, a e-NodeB (eNB), controls the network and transmits data, or may be performed in a user equipment (UE) that is connected to the corresponding wireless network. In the embodiments of the present invention, when a next generation wireless communication system sets a predetermined maximum available region, and a portion of the set region is used based on a network state, as opposed to using the entire set region, a method to utilize an adjacent frequency domain will be provided.

For example, when only a 15 Megahertz (MHz) band is used among a maximum frequency band of 20 MHz that is determined for a single CC, a method to utilize a remaining band of 5 MHz may be provided. A method to utilize a frequency band adjacent to the maximum frequency band of 20 MHz determined for a single CC is additionally provided. Accordingly, a method to improve efficiency of a system by satisfying service requirements in the wireless communication system will be provided.

That is, in a wireless communication environment for which a method to use a plurality of CCs is proposed, although a plurality of CCs are used, an unused region in a range determined for each CC may exist, and the unused region may be applicable to only a device in a predetermined circumstance or only a device that uses a predetermined protocol. In this example, a detailed method to use the unused region will be described.

The wireless communication system may be widely installed so as to provide various communication services, such as a voice service, packet data, and the like. The wireless communication system may include a UE and an evolved Node-B (eNB). The UE and the UE may use various resource allocation methods to be described herein.

Throughout the specifications, the UE may be an inclusive concept indicating a user terminal utilized in a wireless communication, including a UE in WCDMA, long term evolution (LTE), HSPA, and the like, and a mobile station (MS), a user terminal (UT), a subscriber station (SS), a wireless device, and the like in GSM.

The eNB or a cell may refer to a fixed station where communication with the UE is performed, and may also be referred to as a Node-B, a base transceiver system (BTS), an access point, and the like.

The eNB or the cell may be construed as an inclusive concept indicating a portion of an area covered by a base station controller (BSC) in CDMA, a Node B in WCDMA, and the concept may include various coverage areas, such as a megacell, macrocell, a microcell, a picocell, a femtocell, and the like.

In the specifications, the UE and the eNB are used as two inclusive transceiving subjects to embody the technology and technical concepts described in the specifications, and may not be limited to a predetermined term or word.

A multiple access scheme applied to the wireless communication system may not be limited. The wireless communication system may utilize varied multiple access schemes, such as Code Division Multiple Access (CDMA), Time Division Multiple Access (TDMA), Frequency Division Multiple Access (FDMA), Orthogonal Frequency Division Multiple Access (OFDMA), OFDM-FDMA, OFDM-TDMA, OFDM-CDMA, and the like.

Uplink (UL) transmission and downlink (DL) transmission may be performed based on a time division duplex (TDD) scheme that performs transmission based on different times, or based on a frequency division duplex (FDD) scheme that performs transmission based on different frequencies.

An embodiment of the present invention may be applicable to resource allocation in an asynchronous wireless communication scheme that is advanced through GSM, WCDMA, and HSPA, to be LTE and LTE-advanced (LTE-A), and may be is applicable to resource allocation in a synchronous wireless communication scheme that is advanced through CDMA and CDMA-2000, to be UMB.

Embodiments of the present invention may not be limited to a specific wireless communication scheme, and may be applicable to all technical fields to which a technical idea of the present invention is applicable.

FIG. 1 illustrates a plurality of CCs according to an embodiment of the present invention.

Referring to FIG. 1, an LTE-A system may support carrier aggregation (CA) that uses up to five CCs to satisfy various service requirements of a next generation wireless communication system.

That is, the LTE-A may use up to five CCs, and may include at least one backward-compatible (BC) carrier by taking into consideration compatibility with an LTE system.

CCs of a DL 110 and CCs of UL 120 may exist independently, and CC0 among the CCs may be an example of a BC carrier and each CC may use up to a 20 MHz bandwidth. The BC carrier may not be limited to a location of CC0, and CC1, CC2, CC3, or CC4 may be used as a BC carrier based on the configuration of a network.

In the wireless communication system, a BC carrier having a predetermined frequency band may be assigned so as to provide a service to existing UEs. Hereinafter, embodiments of the present invention will be described based on the LTE system and the LTE-A system. However, the embodiments of the present invention may not be limited thereto, and may be applicable to a communication system that uses a partial region of an available frequency band and assigns the corresponding region to a UE, by inclusively changing the configuration.

Figure 2:
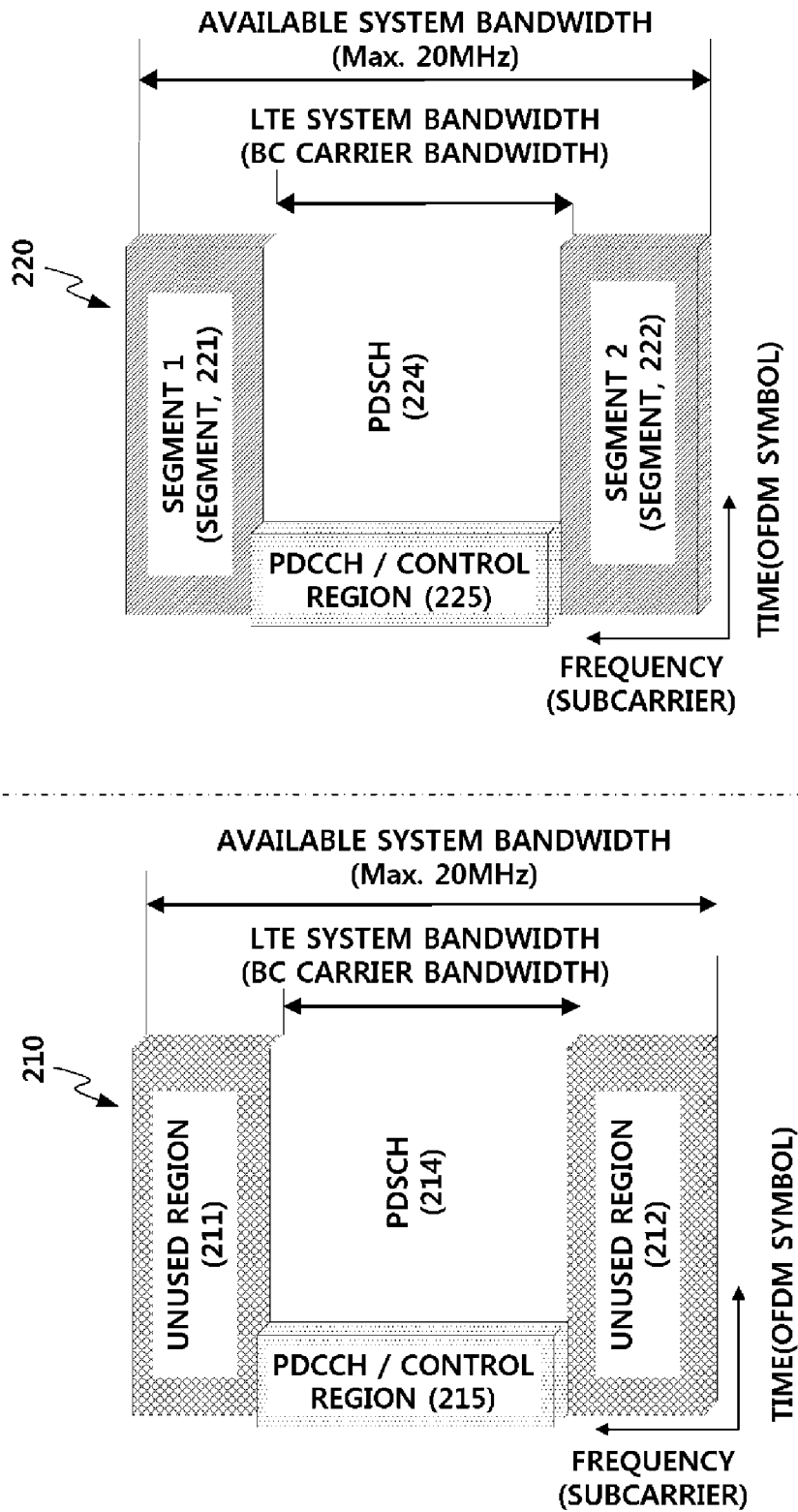
FIG. 2 is a diagram illustrating a concept of a bandwidth that an LTE system or an LTE-A system is able to use according to an embodiment of the present invention.

FIG. 2 illustrates a concept of a bandwidth that an LTE system or an LTE-A system is able to use according to an embodiment of the present invention.

210 of FIG. 2 may be a configuration of a single CC, and may be a configuration of a BC carrier in the LTE system or the LTE-A system. A region that may be assigned to a single CC may be up to 20 MHz.

215 may correspond to a region to which control information is assigned, and may be a physical downlink control channel (PDCCH) or a control region according to an embodiment of the present invention. 214 may correspond to a region through which data is transmitted, and may be a physical downlink shared channel (PDSCH) according to an embodiment of the present invention.

Although the maximum available system bandwidth is set to 20 MHz in 210, generally a region narrower than the full frequency band of 20 MHz may be used in a process of embodying a BC carrier of the LTE system or the LTE-A system taking compatibility into consideration. The maximum system bandwidth may be increased or decreased based on a condition for embodying the system, and a BC carrier may be embodied within the maximum system bandwidth.

For example, when an actually used bandwidth is set to 10 MHz, a remaining bandwidth of 10 MHz among the maximum bandwidth of 20 MHz may not be used.

That is, regions 215 and 214 that are narrower than 20 MHz may be used, and unused regions 211 and 212 may exist in the LTE system or the LTE-A system using a BC carrier by taking compatibility into consideration, as shown in 210 of FIG. 2.

Therefore, when a BC carrier that provides a service to an existing LTE UE uses a bandwidth less than or equal to 20 MHz as shown in 210, there is a desire for a scheme to extend a frequency band for the LTE-A system.

Accordingly, the LTE-A system may extend the unused region in the LTE system or the BC carrier as shown in 220 of FIG. 2. A region that is included in the maximum system bandwidth, but is not used by the LTE system or the BC carrier may be referred to as a carrier segment. Each CC may extend a frequency band to the region and may be set to use a frequency band up to 20 MHz.

Hereinafter, since a partial region of the maximum system bandwidth is used, a method to utilize the bandwidth by extending a frequency band to a remaining region will be described. In the embodiment, the corresponding region may be referred to as a segment. However, embodiments of the present invention may not be limited to the segment or the region, and may include all resources to extend and use system resources of a currently unused region among the available system bandwidth.

220 of FIG. 2 illustrates a structure of a CC that is combined with a carrier segment according to an embodiment of the present invention.

220 of FIG. 2 may use regions 225 and 224 narrower than 20 MHz in the LTE-A system that uses a BC carrier by taking compatibility into consideration, and may set remaining regions, for example, carrier segments 221 and 222, as service regions and thus, may also improve efficiency of a network in the LTE-A system.

Therefore, the LTE-A system may provide regions 221 and 222 as segments so as to additionally assign a bandwidth to a common service band that provides an existing LTE service. This may enable the existing LTE service and the LTE-A-based service to be simultaneously provided, and may improve efficiency of a network.

A condition for embodying the segment as shown in 220 of FIG. 2 will be described.

An LTE service band (or a BC carrier band) is set to be less than or equal to 20 MHz in a maximum size for a CC, for example, 20 MHz, and thus, an extra frequency band may exist and the extra frequency band may be embodied as a segment. Also, as inferred from the structure of 220, up to two segments corresponding to two regions or one segment corresponding to at least one frequency domain may exist adjacent to the existing frequency band (the BC frequency band).

A segment may not be used as a separate CC, may correspond to an extension of an existing bandwidth of a CC and thus, may be configured to be a contiguous frequency domain extension.

Also, embodiments of the present invention may additionally extend a frequency domain to a contiguous region (segment) of a predetermined CI by applying the CI associated with a predetermined CC. In this example, the predetermined CI may be used by receiving assignment of a discontinuous frequency domain as an additional segment, as opposed to the contiguous frequency domain. This may also be applicable to embodiments of the present invention. That is, embodiments of the present invention may provide a method to separately use an unused frequency band existing between a maximum available frequency band of a CC and an actually assigned frequency band.

Figure 3:
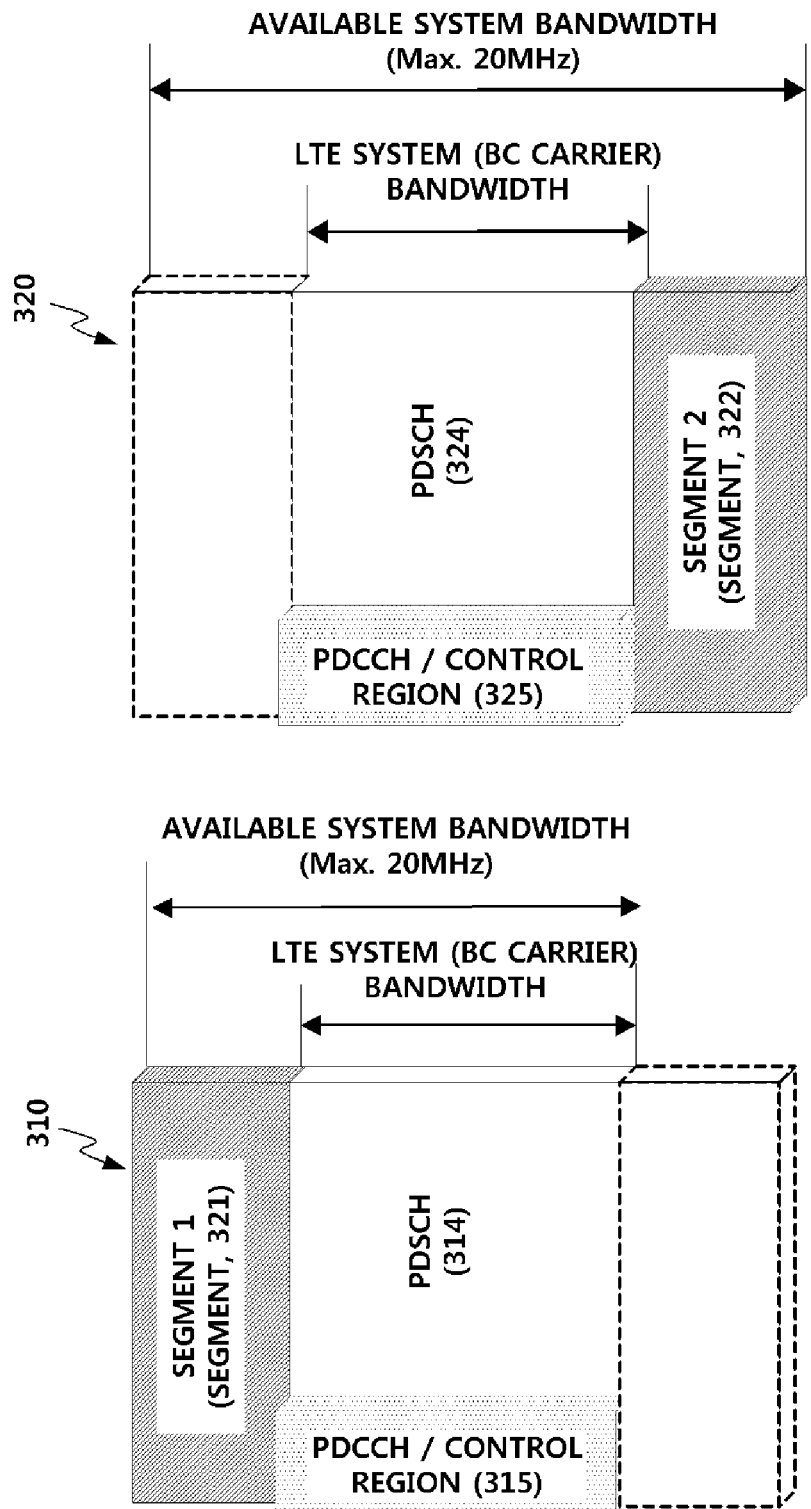
FIG. 3 is a diagram illustrating an example that extends a frequency band to an unused region that is different from an assigned region according to an embodiment of the present invention.

FIG. 3 illustrates an example that extends a frequency band to an unused region that is different from an assigned region according to an embodiment of the is present invention. The extended region may be referred to as a segment according to an embodiment of the present invention.

Although two regions, that is, segment 1 211 and segment 2 222 exist in 220 of FIG. 2, a single segment may exist based on a network state and an implementation scheme, as shown in 310 and 320 of FIG. 3.

Segment regions 211, 222, 311, and 322 corresponding to regions that are used by extension as shown in 220 of FIG. 2 and FIG. 3 may be irrelevant to an LTE UE. Accordingly, an existing LTE UE may not be aware of the existence of a segment, and only an LTE-A UE is able to use a segment region.

Also, according to an embodiment of the present invention, the segment region may be an extension format of a frequency band and thus, may support resource allocation of an existing LTE frequency domain (BC carrier region) and the segment region, through use of single piece of control information, for example, a PDCCH.

The segments regions 221, 222, 311, and 322 corresponding to extensions as shown in 220 of FIG. 2 and FIG. 3 may not operate a separate PDCCH to be used for allocating a segment resource, and may use control information 225, 315, and 325 of the existing LTE frequency domain (a BC carrier region).

Also, a hybrid ARQ (HARQ) process may be applied to a segment and the LTE frequency domain (the BC carrier region), as opposed to separately operating for the segment.

When a segment and a condition for embodying the segment are taken into consideration, existing LTE users may need to take into consideration both a UE of the existing system (LTE) and a UE of the LTE-A, so as to assign a segment in a transmitted and received CC.

Also, a BC carrier corresponding to the LTE service band is continuously maintained and a segment corresponding to an extension region may be assigned to be used in the LTE-A UE. A segment may vary based on a network state or during a process of operating the network, and a bandwidth may be increased or decreased.

Accordingly, an eNB may combine an existing assigned region and an extensible region for the LTE-A UE. For example, resources may be allocated by combining a BC carrier band and a segment band, and an existing LTE UE may allocate resources with respect to a BC carrier. A region (a frequency bandwidth) for resource allocation may vary and thus, although a DL control information (DCI) format transmitted through a PDCCH is the same, a substantially available region may be differently construed and configured based on whether the LTE-A UE or the LTE UE receives the DCI format.

According to an embodiment of the present invention, a CI of 3 bits may be additionally assigned to a DCI format for the LTE-A UE and thus, a portion or all of the information associated with a segment may be transmitted. Hereinafter, additional assignment of the CI of 3 bits will be described with reference to FIG. 6.

Also, embodiments of the present invention may provide a method to transmit associated system information and a reference signal (RS), so as to enable the LTE-A UE to check the segment information of a CC.

The information associated with the segment of the CC may be configured to enable the LTE-A UE to recognize whether a segment exists in the corresponding CC, a number of segments used in a configuration and a segment configuration (three is configurations as shown in 220 of FIG. 2 and FIG. 3), a bandwidth used by a corresponding segment, and the like.

Also, the information associated with the bandwidth may include information associated with a maximum bandwidth of the corresponding segment, and may include information associated with a maximum bandwidth of the corresponding segment and a BC carrier.

When the maximum bandwidth of the CC is 20 MHz as shown in 220 of FIG. 2 and FIG. 3, a sum of a band of the segment and an already assigned band of the CC may not exceed 20 MHz. Also, when a minimum frequency domain of the BC carrier is set in advance, information associated with the bandwidth of the segment may be configured based on the maximum bandwidth of the CC and the minimum frequency size of the BC carrier.

The information associated with the carrier segment may be needed for the LTE-A UE, and may be information that is not needed to be transferred to the LTE-UE.

However, an LTE UE may exist in the BC carrier region where the CC segment exists and thus, an additional information providing method may need to be considered so that the LTE-A UE may recognize the BC carrier region.

The CC segment may perform channel estimation and thus, may need allocation of an RS, which will be described with reference to FIGS. 7 and 8.

Figure 4:
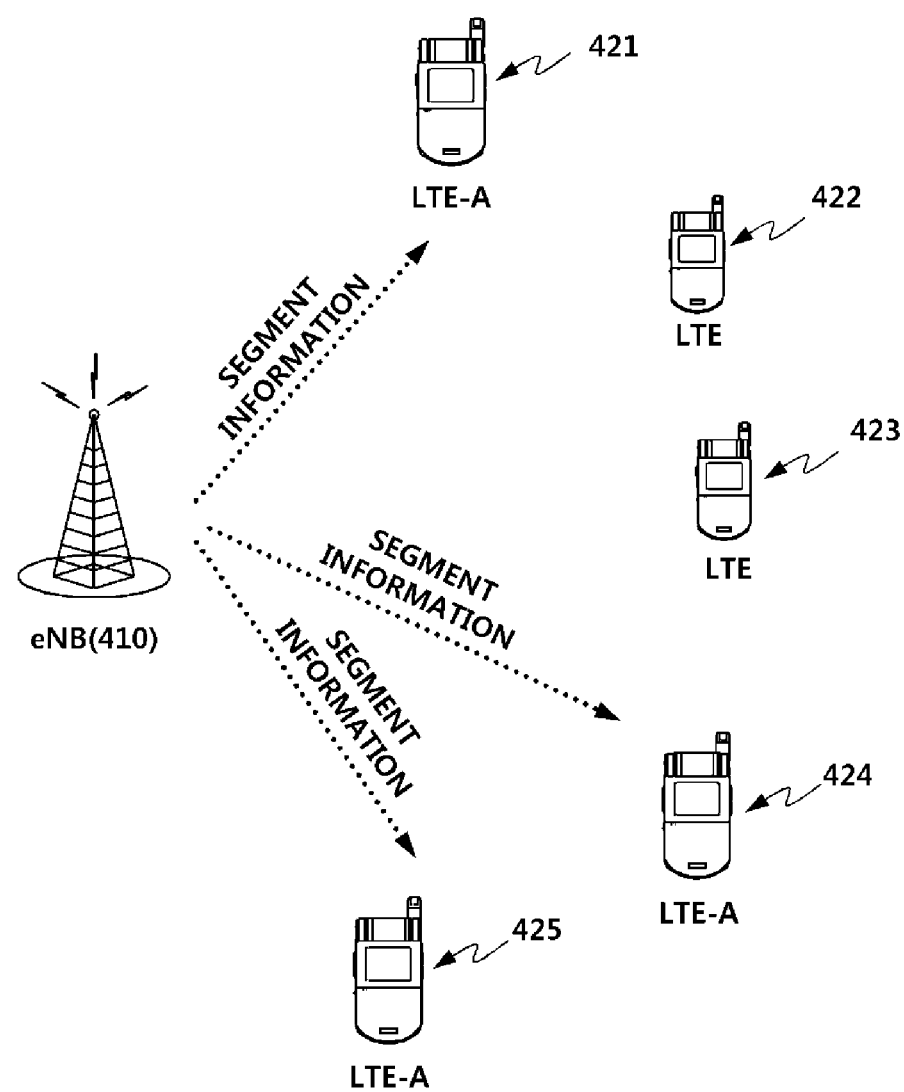
FIG. 4 is a diagram illustrating a process that transmits information associated with an extensible region to an LTE-A user equipment (UE) according to an embodiment of the present invention.

FIG. 4 illustrates a process that transmits information associated with an extensible region to an LTE-A UE according to an embodiment of the present invention. An extension region may be referred to as a segment according to an embodiment of the present invention.

Referring to FIG. 4, an eNB 410 may transmit segment information through use of, for example, a dedicated signal.

The eNB 410 may allocate resources to a bandwidth including CC segments of LTE-A UEs 421, 424, and 425, and may transmit segment information associated with a corresponding segment to all the LTE-A UEs 421, 424, and 425 included in a cell, simultaneously or individually, through use of a UE dedicated signal or an LTE-A UE dedicated signal.

In this example, the segment information may be information associated with a frequency bandwidth of an extensible region or information associated with a location of a start frequency. When a UE and an eNB agree on, in advance, an extension up to a maximum extensible region (a maximum bandwidth of a CC), the frequency band may be extended by a predetermined size based on the information associated with the location of the start frequency or a currently assigned frequency band.

In this example, LTE UEs 422 and 423 may not receive the segment information and may operate in the same manner as in an existing LTE system.

Figure 5:
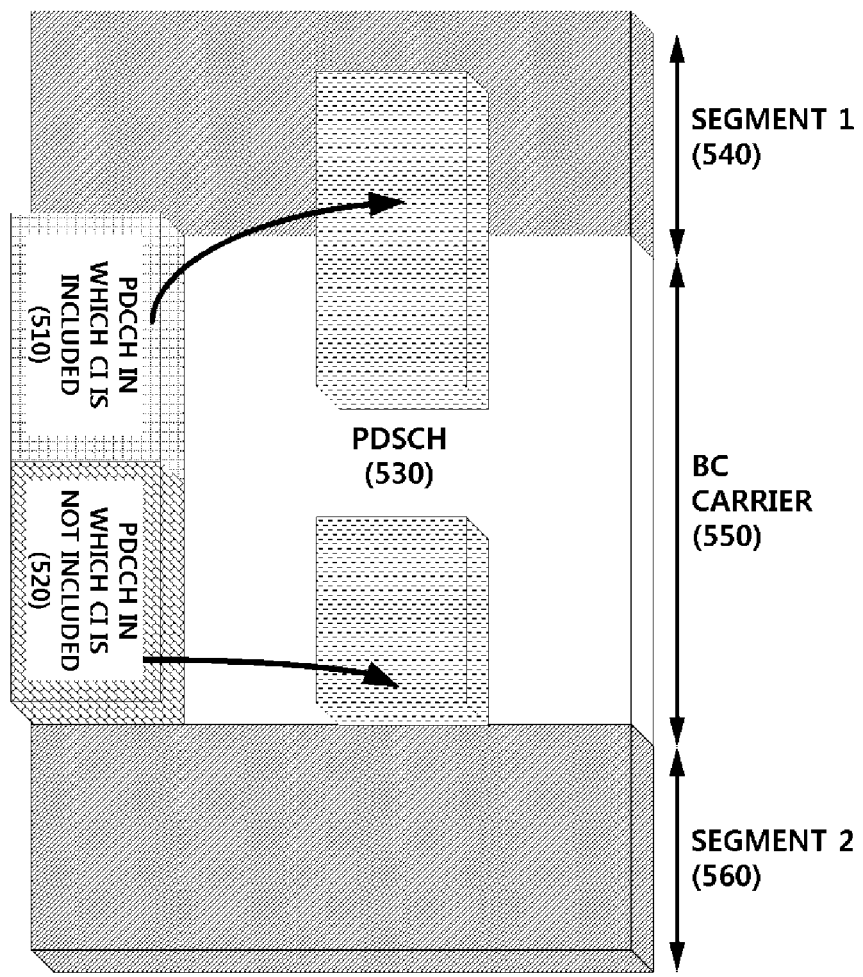
FIG. 5 is a diagram illustrating an example that transmits information associated with an extensible region according to another embodiment of the present invention.

FIG. 5 illustrates an example that transmits information associated with an extensible region according to another embodiment of the present invention. In the embodiment, an extension region may be referred to as a segment.

FIG. 5 illustrates a method in which a dedicated signal as described in FIG. 4 may be used and existence of a segment corresponding to the extensible region may be determined based on common control information. An eNB may reconfigure or use control information that is not used by an LTE UE as an indicator, so as to inform an LTE-A UE of information that the segment is contiguous to a BC carrier.

According to an embodiment of the present invention, the extensible region may be indicated through use of a DCI format of a PDCCH in FIG. 5. That is, when a segment exists in a corresponding CC, a CI may be included in the DCI format. That is, the LTE-A UE may recognize that the segment is contiguous to the BC carrier when the CI is included in the PDCCH and thus, may request segment information from the eNB and may receive the segment information from the eNB through use of the dedicated signal of FIG. 4.

FIG. 5 illustrates two types of PDCCHs 510 and 520. The PDCCH 510 of which a DCI format includes a CI may indicate that segment 1 540 or segment 2 560 exists to be contiguous to a BC carrier 550. Accordingly, the LTE-A UE may only determine the existence of the segment, and may determine a segment configuration and a bandwidth used by the segment through use of the dedicated signal of FIG. 4. That is, when the CI is included in the PDCCH 520, the LTE-A UE may request segment information from the eNB or may receive the segment information from the eNB, through dedicated signaling.

Conversely, the PDCCH 520 of which a DCI format fails to include a CI may indicate that a segment does not exist and thus, the LTE-A UE may use only the BC carrier 550, like the LTE UE. According to an embodiment of the preset invention, the eNB may inform the LTE-A UE of whether a segment exists, through use of information associated with a CI of a DCI format, and the eNB may inform the LTE-A UE of detailed information associated with the segment through use of a type of a dedicated signal and the like as illustrated in FIG. 4.

Figure 6:
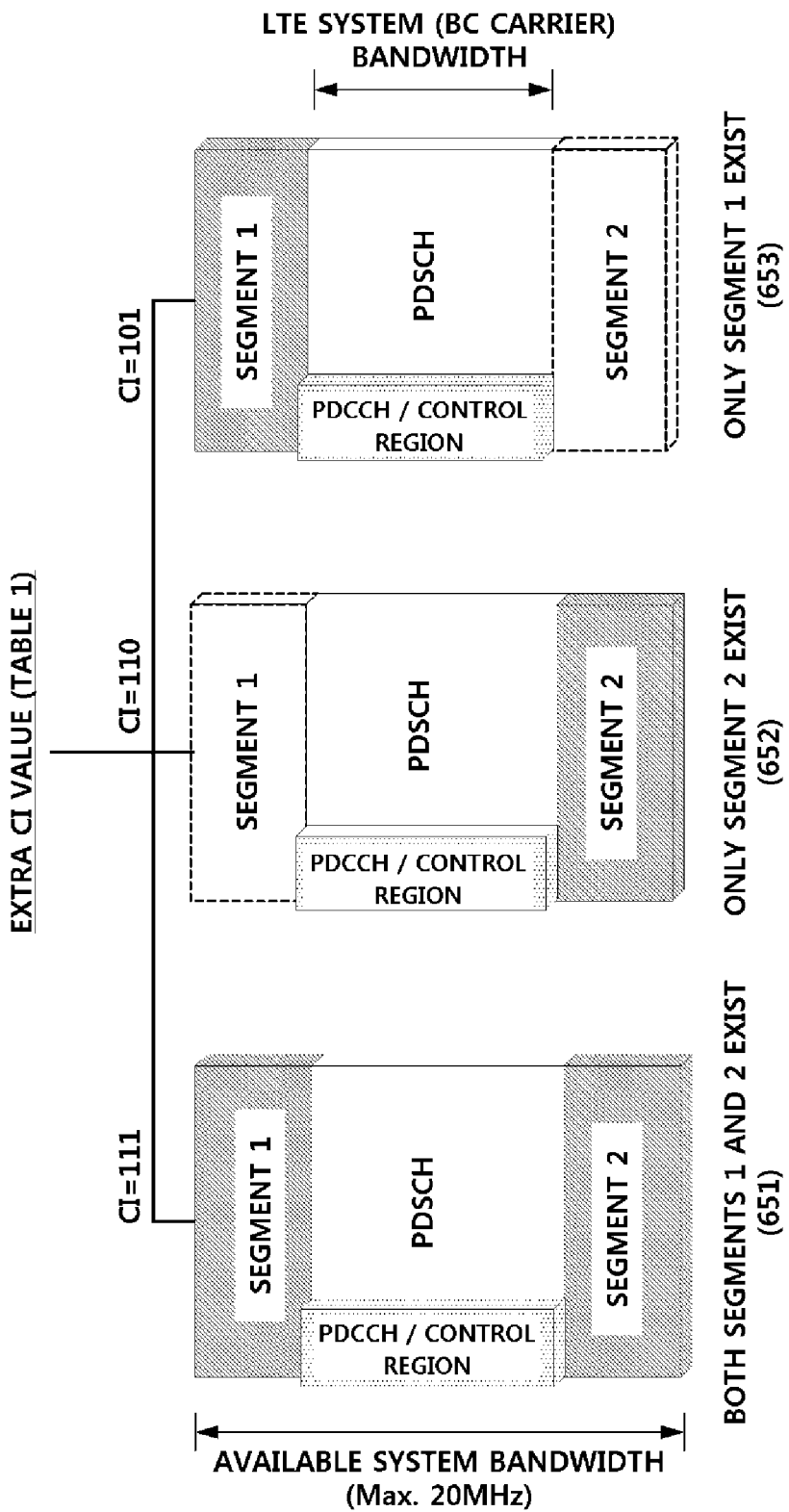
FIG. 6 is a diagram illustrating an example that transmits information associated with an extensible region through use of an extra carrier indicator (CI) according to another embodiment of the present invention.

FIG. 6 illustrates an example that transmits information associated with an is extensible region through use of an extra CI according to another embodiment of the present invention. In the embodiment, an extension region may be referred to as a segment.

Referring to FIG. 6, segment configurations 651, 652, and 653 are illustrated.

A PDSCH may be a frequency band that an existing LTE UE is also able to use, and may be a BC carrier band. The full frequency band of the PDSCH including segment 1 and segment 2 may be an available system bandwidth of up to 20 MHz.

As described in the foregoing, an LTE-A system may use a plurality of CCs. Also, the LTE-A system may use the plurality of CCs based on a CA scheme, and may additionally add a CI to a field that is separate from a DCI format of a PDCCH so as to use the field to distinguish CCs during the CA process.

According to an embodiment of the present invention, to indicate an extensible segment region, information or a codepoint that is not used in a control channel may be used so that a value that is not used in a field used in the control channel indicates a segment, separately. Although a range of a predetermined value of a CI may be used as a codepoint, it may not be limited to the CI and various field values may be used to indicate a segment.

Although a total number of CCs provided by the LTE-A system according to an embodiment may be 5, the number of CCs may be increased or decreased during a process of embodying the system. When all of the current CC of 3 bits is not used and regions corresponding to a few values are used, a segment may be indicated as shown in Table 1.

Hereinafter, when up to 5 CCs are used an embodiment that uses a CI value will be described. When a maximum number of CCs increases, a CI configuration may be changed, and embodiments of the present invention may be differently applied based on the change of the CI configuration. When the number of CCs is up to 5, a total of 3 bits of a CI assigned to identify a CC during a CA process may be expended. A number of cases that may be expressed by the 3 bits may be 8. When an eNB and a UE agree to use only five pieces of information, the remaining three cases may be used as an extra CI. FIG. 6 and Table 1 show the cases that use the extra CI.

TABLE 1 first example that uses an extra CI

| 3-bit CI | CC identification information | Segment configuration |
|---|---|---|
| 000 | CC1 | N/A |
| 001 | CC2 | N/A |
| 010 | CC3 | N/A |
| 011 | CC4 | N/A |
| 100 | CC5 | N/A |
| 101 | N/A | 653 of FIG. 6 |
| 110 | N/A | 652 of FIG. 6 |
| 111 | N/A | 651 of FIG. 6 |

As shown in Table 1, information that is not used from among the CI values of 3 bits to be used for identifying a CC during the CA process may be used as an identifier to indicate whether a segment exists. When a small number of CCs is used in the CA process and a range of numbers that is used as a CI value may decrease, a codepoint may be used to distinguish the CI value and when the CI value is greater than or equal to a predetermined value, the eNB and the UE agree that the CI value may be used to indicate a segment value.

For example, the CI value used for distinguishing a CC may be set to 000 for CC1, may be set to 001 for CC2, may be set to 010 for CC3, may be set to 011 for CC4, and may be set to 100 for CC5.

To configure segment information corresponding to an extensible region, 101, 110, 111 may be set as CI values. The CI values of 101, 110, and 111 may be information that is not used for identifying a CC and thus, may be used as information for an extended segment.

When the CI value is 101, segment 1 may be assigned to be contiguous to a BC carrier, as shown in 653 of FIG. 6. When the CI value is 110, segment 2 may be assigned to be contiguous to the BC carrier, as shown in 652 of FIG. 6. When the CI value is 111, both segment 1 and segment 2 may be assigned to be contiguous to the BC carrier, as shown in 651 of FIG. 6.

The CI value and the segment configuration of Table 1 may be variously determined based on a predetermined agreement in a process of embodying the invention.

As described in FIG. 6 and Table 1, information associated with the extensible region may be provided through use of an unused parameter. For example, three values from among the CI information may indicate whether a segment exists and the segment configuration format, as shown in Table 1. Information associated with the segment configuration format may indicate a number of segments and a set segment configuration, for example, use of a right segment, a left segment, or both segments of a corresponding CC and thus, an LTE-A UE may determine an extended service region.

Accordingly, when a PDCCH includes CI information and a CI value may include the segment configuration, the LTE-A UE may request or receive information associated with the extensible region from the eNB. As described in the foregoing, the LTE-A UE may request or receive information associated with a bandwidth of a segment from the eNB through a dedicated signaling scheme.

In the example, when a total number of used CCs is 3, a codepoint may be applied. A CI value that is in a range of 0 through 2 may be used as information to identify a CC, and a CI value that is greater than or equal to 3 may be used as information indicating a segment corresponding to an extensible region. Also, when a CI uses 4 bits or 5 bits and a number of indicated CCs does not use all the information of the 4 bits or 5 bits, the remaining portion may be embodied to indicate a segment region. The CI information is merely an example to indicate segment configuration information in a PDCCH and thus, another field may be used, or a value of another field or a value of another size may be reused through use of a codepoint.

Also, the LTE-A UE may receive the segment information through use of an upper layer signaling. When the LTE-A UEs are assigned with the same segment, the segment information may be received through a common channel. In this example, the segment information may be received through system information (SI) or a broadcast channel (BCH).

A method of transmitting information associated with a segment to the LTE-A UE has been described with reference to FIGS. 4, 5, and 6 according to is embodiments of the present invention.

The segment information transmitting method embodied in FIGS. 4, 5, and 6 may not require a change of a separate system of an LTE UE that coexists within the BC carrier. Accordingly, the LTE-UE may not recognize a carrier segment, and system information limited to the BC carrier, such as a master information block (MIB) and a system information block (SIB), may be broadcasted through a PDCCH or a control region. The transmitted system information may include a cell identifier (ID), a DL center frequency, a DL bandwidth, a system frame number, and the like, excluding information associated with the carrier segment.

The information associated with an extend segment region may be transmitted so that the LTE-A UE determines the information as shown in FIGS. 4, 5, and 6. Accordingly, the LTE UE may not need to be changed, and a compatibility of the BC carrier may be maintained.

When both a BC carrier and a frequency band of an available network are taken into consideration, the carrier segment may be selectively used and thus, the method that is resilient to a network state as shown in FIGS. 4, 5, and 6 will satisfy both the compatibility and efficiency of the network.

According to an embodiment of the present invention, a segment may be to dynamically assigned and a size of the segment may be increased or decreased based on efficiency of the network. The detailed information may be transmitted to the LTE-A UE through dedicated signaling as described in the foregoing, and the LTE UE that uses only the BC carrier band may perform communication irrespectively of an extension of a CC of the LTE-A UE, for example, generation, change, removal, and the like of a segment.

Hereinafter, channel estimation in a carrier segment will be described according to an embodiment of the present invention. Channel estimation may also need to be performed with respect to the carrier segment that is extended and used.

Accordingly, a method of using an RS for channel estimation associated with an extended segment, such as a cell-specific reference signal (CRS) and a channel state information-reference signal (CRI-RS), will be described.

In this example, a compatibility with the LTE UE needs to be taken into consideration and thus, the method may not affect an RS generation and mapping in the existing LTE band. Accordingly, the RS may be generated to be mapped based on a cell ID and a system bandwidth.

Also, a method of generating and mapping the RS may include 1) maintaining a mapping scheme of a CRS in a BC carrier, 2) applying an RS generation used in the existing LTE system, and 3) using an RS generation procedure of the existing LTE system for an RS assigned for a carrier segment. Based on this, an RS with respect to a segment may be generated as shown in FIGS. 7 and 8.

Figure 7:
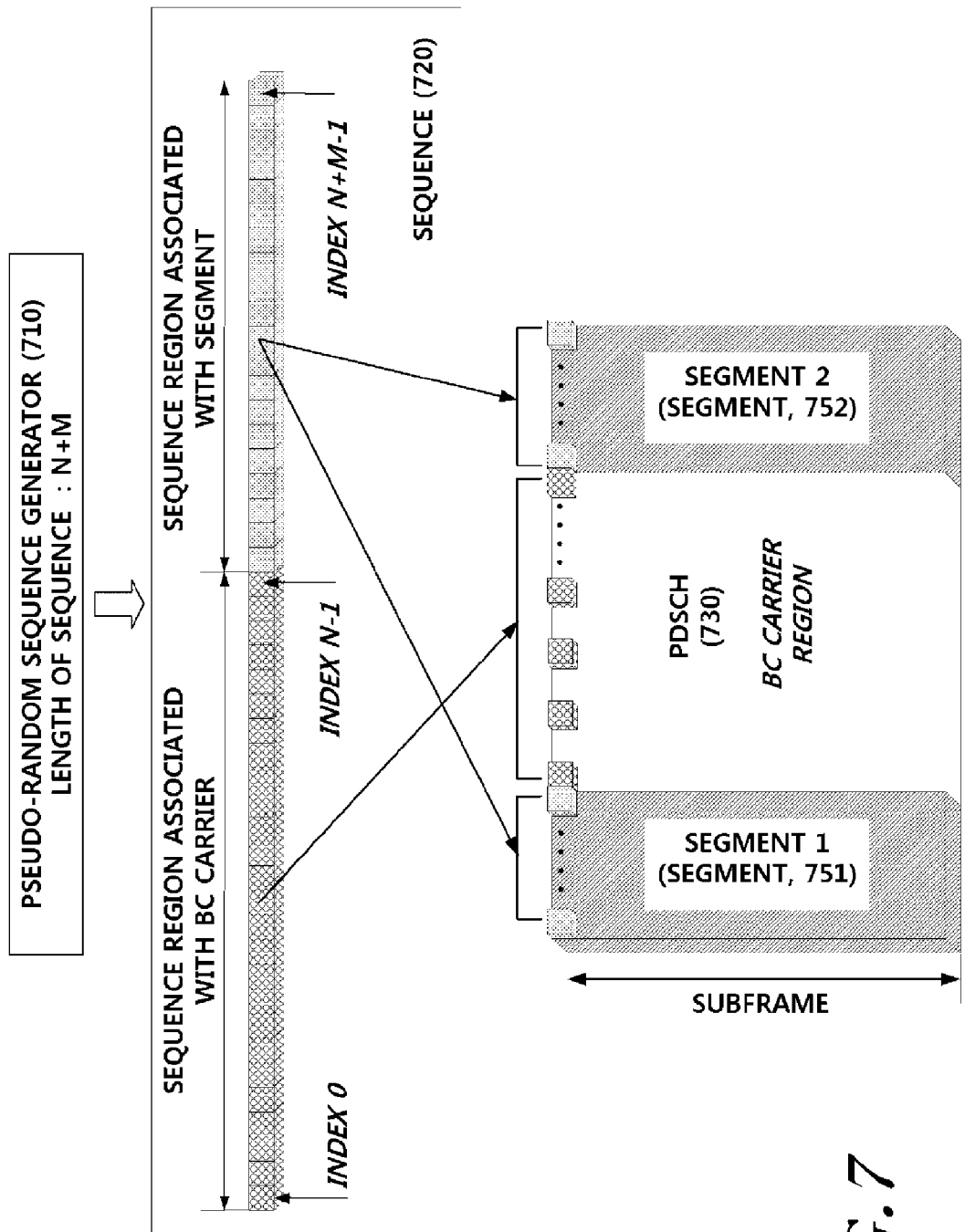
FIG. 7 is a diagram illustrating an example that generates a reference signal unitarily in a subframe according to an embodiment of the present invention.

FIG. 7 illustrates an example that generates an RS unitarily in a subframe according to an embodiment of the present invention. An extension region may be referred to as a segment according to an embodiment of the present invention.

Referring to FIG. 7, a cell ID and a DL system bandwidth may be used when an RS is generated in an LTE system.

In FIG. 7, a sequence may be generated by inputting the cell ID as an initial value of a Pseudo-random sequence generator 710 and using all the bandwidth including a bandwidth of a BC carrier and segments as a bandwidth of a system.

In FIG. 7, a sequence 720 having a length of N+M may be generated through use of N calculated from a length of the bandwidth of the BC carrier and M calculated from a length of the bandwidth of a segment corresponding to an extensible region. From among generated sequences, 0 through N−1 sequences may be mapped as sequences associated with an RS of a BC carrier 730, and N through M+1 sequences may be mapped as sequences of an RS associated with segments 751 and 752.

Figure 8:
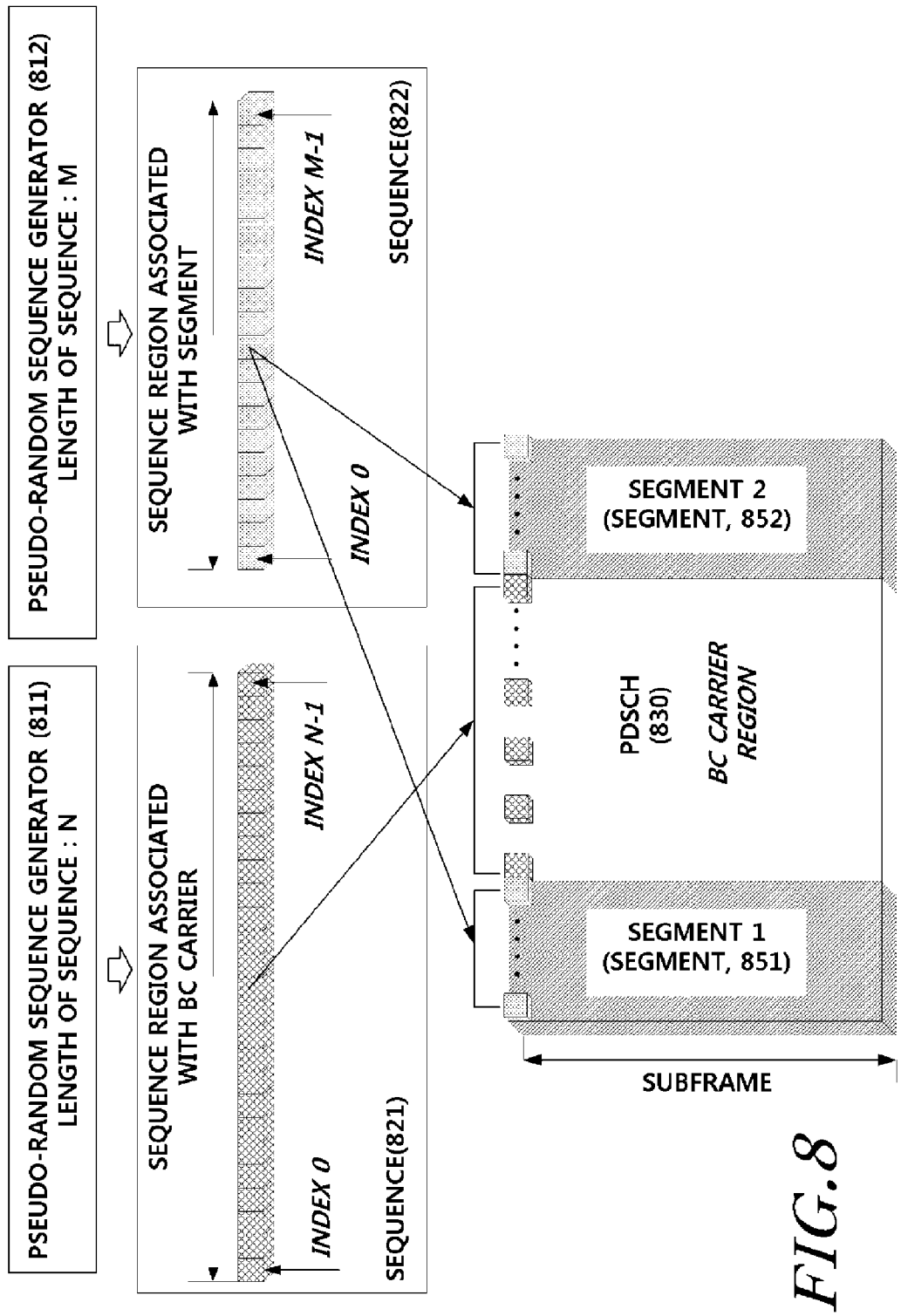
FIG. 8 is a diagram illustrating an example that generates reference signals separately in a subframe according to an embodiment of the present invention.

FIG. 8 illustrates an example that generates RSs separately in a subframe according to an embodiment of the present invention.

Referring to FIG. 8, a BC carrier 830 and segments 851 and 852 may generate RSs separately and may perform mapping and thus, the BC carrier 830 may proceed with a RS generating process in an existing LTE system.

A pseudo-random sequence generator 811 may set a cell ID to an initial value, and may generate a sequence 821 through use of N calculated from a bandwidth of the BC carrier 830 as a length of the sequence. The sequence 821 may be mapped to the BC carrier 830.

Another pseudo-random sequence generator 812 may generate a sequence with respect to a segment, irrespectively of the pseudo-random sequence generator 811. That is, pseudo-random sequence generator 812 may not use the cell ID corresponding to the sequence generation initial value of the pseudo-random sequence generator 811, and may set an initial value M by adding a predetermined offset to the cell ID. That is, a sequence 822 having a length corresponding to the segment band may be separately generated and mapped.

An RS that is not applicable to an LTE UE and is needed for only the LTE-A UE, such as a CSI-RS, may be generated and assigned based on both a BC carrier and a segment.

When an RS is generated as described in FIGS. 7 and 8, an RS may exist in an existing LTE band and may simultaneously exist in a carrier segment corresponding to a frequency band extended to be contiguous to the existing LTE band. The RS may be generated based on the existing LTE band and thus, an LTE-UE may not need to be changed and compatibility may be satisfied.

Figure 9:
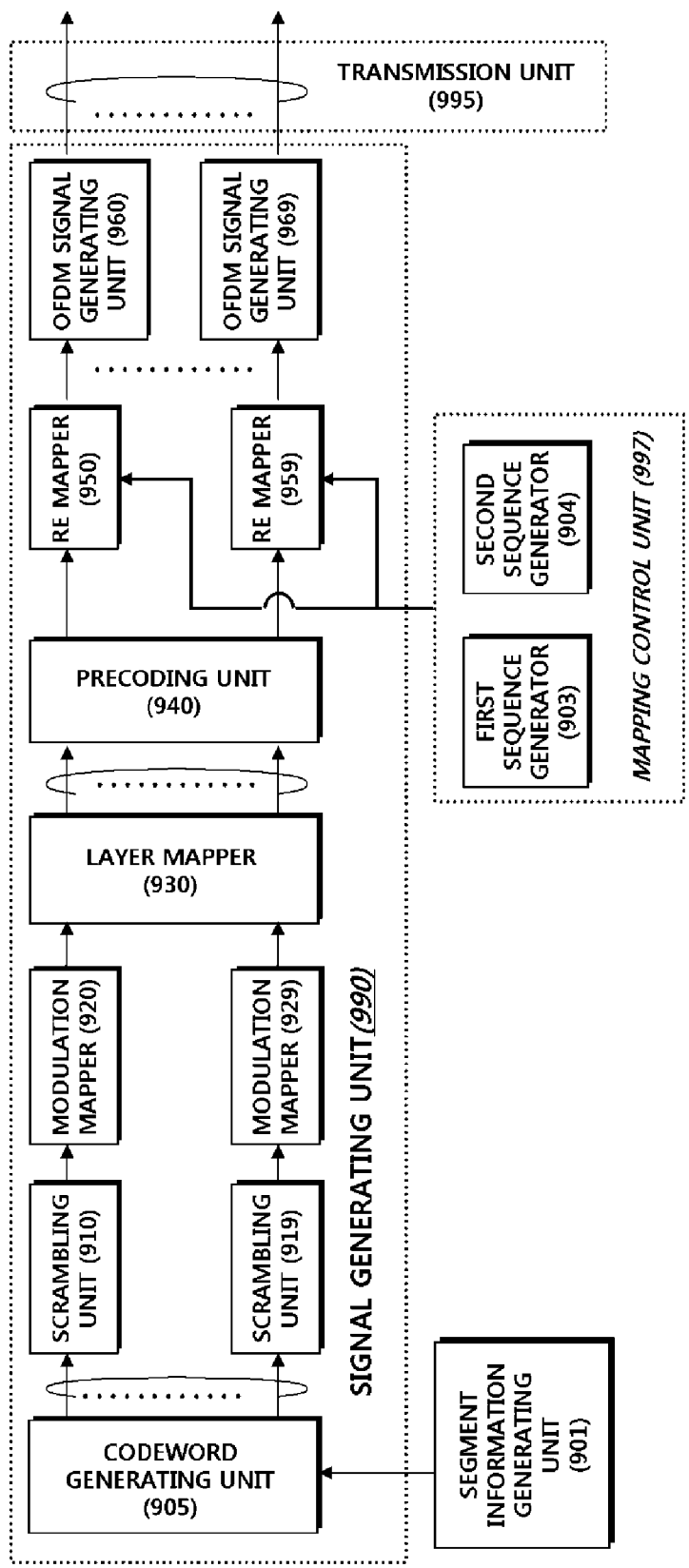
FIG. 9 is a diagram illustrating a structure of an apparatus that generates and transmits information associated with an extensible region and a reference signal according to an embodiment of the present invention.

FIG. 9 illustrates an architecture that generates and transmits information associated with an extensible region in an eNB and an RS according to an embodiment of the present invention. The extension region may be referred to as a segment according to an embodiment of the present invention. Component elements that may be included in the eNB may include a segment information generation unit, a mapping control unit, a signal generation unit, and a transmission unit.

In particular, the segment information generation unit may determine an additional assignment of a second region (a second segment) that is different from a first region (a first segment) to a CC of the first region (the first segment) having a bandwidth narrower than a maximum assignable bandwidth of a CC, and may generate information associated with the second region (the second segment).

The mapping control unit may generate an RS to be used for channel estimation in the first region (first segment) and the second region (the second segment), and may perform controlling so as to assign the RS to a frequency band including the first region (the first segment) and the second region (the second segment).

The signal generation unit may generate the information associated with is the second region (the second segment) and the RS signal assigned by the mapping control unit to be a wireless signal, and the transmission unit may transmit the generated wireless signal. Subsequently, resources may be allocated to the first and second regions (the first and second segments) including the extended region, so that transmission and reception of data with a UE may be performed.

FIG. 9 will be described based on a segment according to an embodiment of the present invention. Segment information may be divided into segment configuration information and segment detailed information. The segment configuration information may include whether a segment exists and information associated with a segment configuration format. Also, the segment detailed information may include a bandwidth of a segment, system information, and the like.

The segment configuration information and the segment detailed information may be transmitted through dedicated signaling as described in FIG. 4. Also, the segment configuration information may be transmitted through an unused value of a CI and the segment detailed information may be transmitted through a dedicated signal, as shown in FIG. 6 and Table 1. Only the information associated with the existence of a segment from among the segment configuration information may be determined through a CI field as shown in FIG. 5, and the remaining segment configuration information and the segment detailed information may be embodied to be transmitted through a dedicated signal. Although embodiments of the present invention describe a dedicated signal as an example, and the segment detailed information and the segment configuration information may be transmitted and received through an RRC signaling or a separate upper signaling.

Referring to FIG. 9, a segment information transmitting apparatus may show a configuration of an eNB.

Accordingly, the transmitting apparatus may include a segment information generation unit 901 to generate segment information associated with an extensible region in a CC, a mapping control unit 997 to generate an RS for channel estimation and to perform controlling so as to assign the RS to the segment and the CC, a signal generation unit 990 to generate the segment information and the RS assigned by the mapping control unit to be a wireless signal, and a transmission unit 995 to transmit the generated wireless signal.

The eNB may perform transmission and reception of data with a UE, through use of resources of the CC and the segment contiguous to the CC.

As described in the foregoing, segment configuration information corresponding to one of the segment information generated by the segment information generation unit 901 may be included in a region of a PDCCH corresponding to a control region, as predetermined indication information, as shown in FIGS. 5 and 6.

In particular, when the segment is contiguous to the CC, a CI may be included in a DCI format of the PDCCH as shown in FIG. 5 and thus, an LTE-A UE may determine whether a segment is assigned through use of the CI of the DCI format of the PDCCH. That is, when the CI is included in the DCI format of the PDCCH, a UE may determine that information associated with the second region that is extensible is included.

When the segment exists, information associated with a segment configuration format or a bandwidth of a segment may be requested from the eNB, and is the eNB may transmit or receive detailed information through the dedicated signaling of FIG. 4, irrespectively of the request.

In the same manner, an extra CI corresponding to an extended CI of the DCI format of the PDCCH may be configured to include the segment configuration information. The CI may be configured to include information associated with a number of segments and a segment structure in remaining information excluding information used for identifying a CC, as shown in Table 1.

The segment information transmitted by the eNB may be generated to be a wireless signal. This process may be performed in the signal generation unit 990, which will be described as follows. A codeword generating unit 905 may generate the segment information to be a codeword, and the codeword may be scrambled in scrambling units 910 through 919. Blocks of the scrambled bits may be modulated to be a symbol based on a predetermined modulation scheme in modulation mappers 920 through 929. The modulation may include biphase shift keying (BPSK), quadrature phase shift keying (QPSK), and the like. In a case of a PDCCH, modulation may be performed through the QPSK.

The symbol may be mapped to various layers by a layer mapper 930. In this process, when a single antenna port is used for transmission, the symbol may be mapped to a single layer for transmission.

Conversely, when a plurality of antenna ports is used for transmission, a multi-antenna transmission scheme may be used. The layer mapping may be performed through use of the multi-antenna transmission scheme such as a spatial multiplexing or a transmit diversity.

When the layer mapping is completed, a precoding unit 940 may generate a vector block so that mapping is performed on resources based on a mapping scheme of an antenna port. A precoding scheme may be determined based on a number of antennas determined by the layer mapping and a multi-antenna mapping scheme.

When the precoding is completed, resource element (RE) mappers 950 through 959 may perform mapping with respect to REs.

A mapping control unit 997 to control mapping with respect to the RSs may control the RE mappers 950 through 959 so that an RS with respect to a segment may be transmitted together.

In particular, as shown in FIG. 7, the mapping control unit 997 may perform controlling so as to assign an RS based on a single sequence that is generated by a single sequence generator through use of a length of a CC and the entire segment and a cell ID of the CC. In this example, the RS may be assigned to the CC and the entire segment.

Conversely, as shown in FIG. 8, the mapping control unit 997 may generate separate sequences through use of two sequence generators 903 and 904.

The first sequence generator 903 may generate a first sequence through a value calculated from a bandwidth of the CC and the cell ID of the CC, and the second to sequence generator 904 may generate a second sequence through a value calculated from a bandwidth of the segment and a value obtained by adding a predetermined offset to the cell ID of the CC.

The mapping control unit 997 may control the RE mapper so as to assign the RS to the CC based on the first sequence, and may control the RE mapper so as to is assign the RS to the segment based on the second sequence.

When the RE mapping is completed, OFDMs generated by OFDM signal generating units 960 through 969 may be transmitted through an antenna port of the transmission unit 975.

The various component elements of the signal generation unit 990 may function as a single module, or may function as separate sub-modules. Also, a predetermined module may be excluded based on a characteristic of a communication protocol, or a separate module required for the communication protocol may be added.

Also, a receiving apparatus according to embodiments of the present invention may reversely perform the operation of the transmitting apparatus. For example, a segment information acquirement unit of the receiving apparatus is a block that corresponds to the segment information generation unit 901 of the transmitting apparatus, and may receive segment information through a dedicated signaling, or may receive segment detailed information through the dedicated signal after determining existence of a segment by receiving an unused value of an extra CI, as shown in FIG. 6 and Table 1, or may determine the existence of the segment through a CI field as shown in FIG. 5 and may receive both the remaining segment configuration information and the segment detailed information through the dedicated signaling.

That is, the segment information acquirement unit may determine information received through the dedicated signaling, may determine predetermined indication information in a region of a PDCCH, or determine whether a segment is assigned through use of a CI of a DCI format of the PDCCH. In this example, the receiving apparatus may include a mapping control unit 997 so as to perform channel is estimation with respect to an additionally assigned segment region. In this example, a sequence for channel estimation may be configured based on descriptions provided with reference to FIGS. 7 and 8. In particular, it will be described with reference to FIG. 12.

Figure 10:
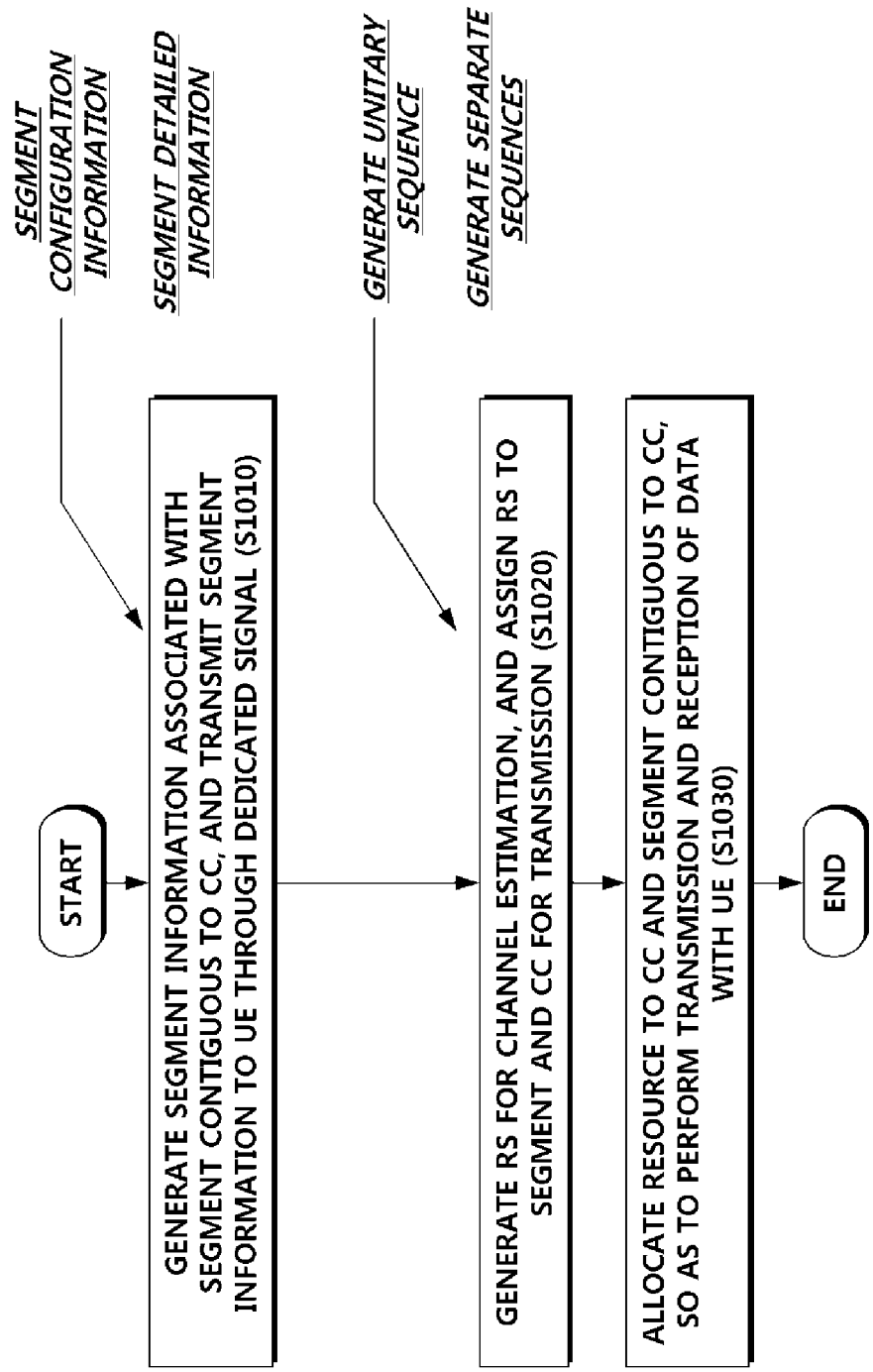
FIG. 10 is a diagram illustrating a process in which a base station such as an e-NodeB (eNB) processes a signal according to an embodiment of the present invention.

FIG. 10 illustrates a process of transmitting information associated with an extensible region according to an embodiment of the present invention. The extension region may be referred to as a segment according to an embodiment of the present invention.

Referring to FIG. 10, an eNB may generate segment information associated with a segment contiguous to a CC, and may transmit the segment information to a UE through use of a dedicated signal (step S1010). The segment information may be divided into segment configuration information and segment detailed information. As described in the foregoing, the process of transmitting the segment information is the same as FIG. 4.

The segment configuration information of the segment information may be configured to be included in a control region or control information of the CC as an indicator, as shown in FIGS. 5 and 6.

In particular, when the segment is contiguous to the CC, a CI may be configured to be included in a DCI format of a PDCCH. When the CI is included in the DCI format of the PDCCH, an LTE-A UE may determine that a segment exists and thus, the LTE-A UE may receive remaining segment configuration information and the segment detailed information through a dedicated signal.

However, as shown in FIG. 6, the segment configuration information may be included as an extra carrier format in the CI of the DCI format of the PDCCH. In this is example, the segment configuration information may be configured to include information associated with a number of segments and a segment structure as shown in Table 1.

Also, when the extra CI value is set in the DCI format of the PDCCH, the LTE-A UE may determine the segment configuration information and thus, may receive the segment detailed information through a dedicated signal.

In addition to the transmission of the segment information, an RS may be generated and may be assigned to the segment and the CC for transmission (step S1020). This may be performed irrespectively of step S1010, or may be performed simultaneously with step S1010. As described in FIGS. 7 and 8, the RS may be generated by taking into consideration compatibility with an LTE UE.

As described in FIG. 7, a sequence may be generated based on a length of the entire segment and the CC and a cell ID of the CC, and an RS may be assigned based on the sequence.

Also, as described in FIG. 8, a first sequence may be generated based on a value calculated from a bandwidth of the CC and the cell ID of the CC, and an RS may be assigned to the CC based on the first sequence.

Also, a second sequence may be generated based on the value calculated from a bandwidth of the sequence and a value obtained by adding a predetermined offset to the cell ID of the CC, and the RS may be assigned to the segment based on the second sequence.

After transmission of the segment information and the RS, transmission and reception of data with the UE may be performed by allocating resources to the CC and the segment that is contiguous to the CC.

The process of transmitting the segment information through a dedicated signaling may be performed by combining generating of an RS and assigning and transmitting of the RS, or by proceeding with one of them first. Although FIG. 10 has been described by using an extensible region as a segment, this may not be limited thereto, and the extensible region may be applicable to a region that is separately used by a system to be embodied, in addition to the segment.

Figure 11:
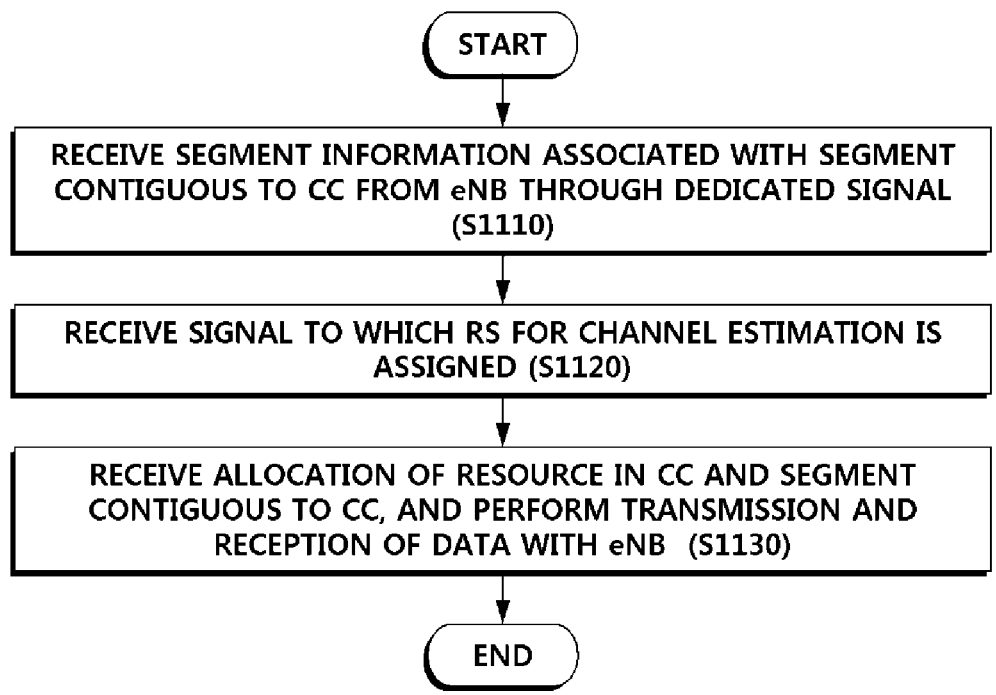
FIG. 11 is a diagram illustrating a process in which a UE receives is information associated with an extensible region and a reference signal, and performs transmission and reception of data in the extensible region according to an embodiment of the present invention.

FIG. 11 illustrates a process in which a UE receives information associated with an extensible region and an RS, and performs transmission and reception of data in the extensible region according to an embodiment of the present invention. The extension region may be referred to as a segment according to an embodiment of the present invention.

The UE may receive segment information associated with a segment contiguous to a CC, from an eNB through a dedicated signal (step S1110). As described in FIG. 4, the UE may receive all the segment information through the dedicated signal, as described in FIG. 4.

Information associated with whether the segment exists or segment configuration information may be included in a control region or control information of a CC as an indicator, as shown in FIGS. 5 and 6.

In particular, when the segment is contiguous to the CC, whether a CI is included in a DCI format of a PDCCH may be determined. In this example, when the CI is included, it indicates that an indicator indicating information associated with the segment is included and thus, the UE may request segment configuration information and is segment detailed information from the eNB, and may receive the information through the dedicated signal in the same manner as step S1110.

Also, the segment configuration information may be included in the CI of the DCI format of the PDCCH, and information associated with a number of segments and segment structure is included in the CI and thus, the UE may request the segment detailed information from the eNB and may receive the information through a dedicated signal in the same manner as step S1110.

A signal to which an RS for channel estimation is assigned may be received irrespective of or simultaneously with step S1110 (step S1120). The RS for channel estimation may be generated based on two schemes as described in FIGS. 7 and 8, and may be transmitted.

Figure 12:
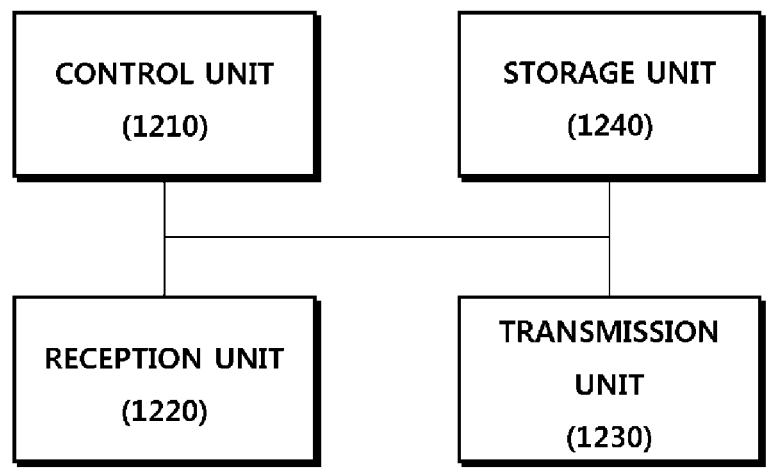
FIG. 12 is a diagram illustrating an architecture in which a UE receives information associated with an extensible region and a reference signal, and performs transmission and reception of data in the extensible region according to an embodiment of the present invention.

FIG. 12 illustrates an architecture in which a UE receives information associated with an extensible region and an RS, and performs transmission and reception of data in the extensible region according to an embodiment of the present invention.

Referring to FIG. 12, the architecture may include a control unit 1210, a reception unit 1220, a transmission unit 1230, and a storage unit 1240. A segment information acquirement unit that has been described with reference to FIG. 9 may be included in the control unit 1210.

In particular, the reception unit 1220 may receive, from an eNB through a dedicated signal, information associated with a second region that is different from a CC of a first region having a bandwidth narrower than a maximum assignable bandwidth of a CC, and may receive a signal to which an RS for channel estimation in the first region and the second region is assigned. The transmission unit 1230 may transmit data to the eNB. The storage unit 1240 may store the information associated with the received second region, and the control unit 1210 may control the reception unit 1220, the transmission unit 1230, and the storage unit 1240.

In particular, the control unit 1210 may control the storage unit 1240 so that the information associated with the second region is stored in the storage unit 1240, and may control the transmission unit 1230 and the reception unit 1220 to perform transmission and reception of data with the eNB by receiving allocation of resources in the first region and the second region. Here, an example of the second region may be a segment.

As described in FIGS. 5 and 6, the information associated with the second region may be included in a control region or control information of the CC of the first region as an indicator, and may be transmitted. In particular, the control information may be received through a PDCCH. When a CI is included in a DCI format of the PDCCH as shown in FIG. 5, the control unit 1210 may perform controlling so that the second region is assigned to be contiguous to the first region. When the control information is received through the PDCCH, and configuration information associated the second region is included in the CI of the DCI format of the PDCCH as shown in FIG. 6, the control unit 1210 may perform controlling based on the information associated with a number of second regions and a second region structure, included in the CI.

As described in FIG. 7, an RS may be assigned based on a sequence that is generated based on a length of the entire second region and the CC of the first region and a cell ID of the CC of the first region. As described in FIG. 8, an RS included in a bandwidth of the CC of the first region may be mapped based on a first sequence that is is generated based on the bandwidth of the CC of the first region and a cell ID of a cell that includes the CC of the first region, and an RS included in a bandwidth of the second region may be mapped based on a second sequence that is generated based on a value calculated from the bandwidth of the second region and a value obtained by adding a predetermined offset to the cell ID of the CC of the first region.

As described in FIG. 7, an RS may be mapped based on a sequence that is generated based on a length of the entire segment and the CC and the cell ID of the CC.

Also, as described in FIG. 8, mapping may be performed by applying different sequences to the CC and the segment. An RS mapped to the CC may be checked by an LTE UE.

Accordingly, the segment method may maintain compatibility and improve efficiency in using a network band by additionally assigning a region in addition to a frequency band that provides a service to existing users.

Although exemplary embodiments of the present invention have been described for illustrative purposes, those skilled in the art will appreciate that various modifications, additions and substitutions are possible, without departing from the scope and spirit of the invention as disclosed in the accompanying claims. Therefore, the embodiments disclosed in the present invention are intended to illustrate the scope of the technical idea of the present invention, and the scope of the present invention is not limited by the embodiment. The scope of the present invention shall be construed on the basis of the accompanying claims in such a manner that all of the technical ideas included within the scope equivalent to the claims belong to the present invention.

The invention claimed is:

1. A base station (BS), comprising: a region information generator to determine additional assignment of a second region in a frequency band different from a first region in the frequency band, a component carrier (CC) of the first region having a bandwidth narrower than a maximum assignable bandwidth of the CC, and to generate information associated with the second region; a mapping controller to generate a reference signal to be used for channel estimation in the first region and the second region, and to control the reference signal to be assigned to a frequency band including the first region and the second region; a signal generator to generate the information associated with the second region and the reference signal assigned by the mapping controller to be a wireless signal; an a transmitter to transmit the generated wireless signal wherein the BS allocates resources to the first region and the second region so as to perform transmission and reception of data with a user equipment (UE), and wherein the mapping controller comprises a first sequence generator and a second sequence generator, the first sequence generator generates a first sequence based on a value calculated from a bandwidth of the CC of the first region and a cell identifier (ID) of the CC of the first region, the second sequence generator generates a second sequence based on a value calculated from a bandwidth of the second region and a value obtained by adding a predetermined offset to the cell ID of the CC of the first region, and the mapping controller controls the reference signal to be assigned to the CC of the first region, based on the first sequence, and controls the reference signal to be assigned to the second region based on the second sequence.

2. The BS as claimed in claim 1, wherein the information associated with the second region is included in control region or control information of the CC of the first region as an indicator, and is transmitted.

3. The BS as claimed in claim 2, wherein the control information is transmitted through a physical downlink control channel (PDCCH); and a carrier indicator (CI) is included in a downlink control information (DCI) format of the PDCCH when the second region is contiguous to the CC of the first region, and the second region is inferred based on the existence of the CI.

4. The BS as claimed in claim 2, wherein the control information is transmitted through a physical downlink control channel (PDCCH), and configuration information associated with the second region is included in a carrier indicator (CI) of a downlink control information (DCI) format of the PDCCH; and information associated with a number of second regions and a structure of the second region is included in the CI.

5. The BS as claimed in claim 1, wherein the mapping controller performs controlling so that the reference signal is assigned based on a sequence that is generated through use of a total length of the first region and the second region and a cell identifier (ID) of the CC of the first region.

6. The BS as claimed in claim 1, wherein a length N of the first sequence is determined based on the bandwidth of the CC of the first region, and a length M of the second sequence is determined based on the bandwidth of the second region.

7. A method for transmitting extension information of a component carrier (CC), the method comprising: determining an additional assignment of a second region in a frequency band that is different from a first region in the frequency band, a CC of the first region having a bandwidth narrower than a maximum assignable bandwidth of the CC; generating and transmitting information associated with the second region; generating a reference signal to be used for channel estimation in the first region and the second region, and transmitting the reference signal by assigning the reference signal to a frequency band including the first region and the second region; and performing transmission and reception of data with a user equipment (UE) by allocating resources to the first region and the second region, wherein assigning and transmitting of the reference signal comprises: assigning, to the CC of the first region, the reference signal based on a first sequence that is generated based on a value calculated from a bandwidth of the CC of the first region and a cell identifier (ID) of the CC of the first region; and assigning, to the second region, the reference signal based on a second sequence that is generated based on a value calculated from a bandwidth of the second region and a value obtained by adding a predetermined offset to the cell ID of the CC of the first region.

8. The method as claimed in claim 7, wherein the information associated with the second region is included in control region or control information of the CC of the first region as an indicator, and is transmitted.

9. The method as claimed in claim 8, wherein the control information is transmitted through a physical downlink control channel (PDCCH); and a carrier indicator (CI) is included in a downlink control information (DCI) format of the PDCCH when the second region is contiguous to the CC of the first region, and the second region is inferred based on the existence of the CI.

10. The method as claimed in claim 7, wherein the control information is transmitted through a physical downlink control channel (PDCCH), and configuration information associated with the second region is included in a carrier indicator (CI) of a downlink control information (DCI) format of the PDCCH; and information associated with a number of second regions and a structure of the second region is included in the CI.

11. The method as claimed in claim 7, wherein the reference signal is assigned based on a sequence that is generated through use of a total length of the first region and the second region and a cell identifier (ID) of the CC of the first region.

12. The method as claimed in claim 7, wherein a length N of the first sequence is determined based on the bandwidth of the CC of the first region, and a length M of the second sequence is determined based on the bandwidth of the second region.

13. A user equipment (UE), comprising: a receiver to receive, from a base station (BS) through a dedicated signal, information associated with a second region in a frequency band different from a first region in the frequency band, a component carrier (CC) of the first region having a bandwidth narrower than a maximum assignable bandwidth of the CC, and to receive a signal to which a reference signal for channel estimation in the first region and the second region is assigned; a transmitter to transmit data to the BS; a storage device to store received information associated with the second region; and a controller to control the storage device to store the information associated with the second region, and to control the transmitter and the receiver to perform transmission and reception of data with the BS by receiving allocation of resources in the first region and the second region, wherein a reference signal included in a bandwidth of the CC of the first region is mapped based on a first sequence that is generated based on the bandwidth of the CC of the first region and a cell identifier (ID) of a cell where the CC of the first region is included; and a reference signal included in a bandwidth of the second region is mapped based on a second sequence that is generated based on a value calculated from the bandwidth of the second region and a value obtained by adding a predetermined offset to the cell ID of the CC of the first region.

14. The UE as claimed in claim 13, wherein the information associated with the second region is included in a control region or control information of the CC of the first region as an indicator, and is transmitted.

15. The UE as claimed in claim 14, wherein the control information is received through a physical downlink control channel (PDCCH); and the controller performs controlling so that the second region is assigned to be contiguous to the first region when a control indicator (CI) is included in a downlink control information (DCI) format of the PDCCH.

16. The UE as claimed in claim 14, wherein the control information is received through a physical downlink control channel (PDCCH), and configuration information of the second CC is included in a control indicator (CI) of a downlink control information (DCI) format of the PDCCH; and the controller performs controlling so as to receive an assignment of the second region through use of information associated with a number of second regions and a structure of the second region, included in the CI.

17. The UE as claimed in claim 13, wherein the reference signal is assigned based on a sequence that is generated based on a total length of the CC of the first region and the second region, and a cell identifier (ID) of the CC of the first region.

18. The UE as claimed in claim 13, wherein a length N of the first sequence is determined based on the bandwidth of the CC of the first region, and a length M of the second sequence is determined based on the bandwidth of the second region.

19. A method for receiving extension information of a component carrier (CC), the method comprising: receiving, from a base station (BS) through a dedicated signal, information associated with a second region in a frequency band different from a first region in the frequency band, a CC of the first region having a bandwidth narrower than a maximum assignable bandwidth of the CC; receiving a signal to which a reference signal for channel estimation in the first region and the second region is assigned; and performing transmission and reception of data with the BS by receiving allocation of resources in the first region and the second region, wherein the reference signal included in a bandwidth of the CC of the first region is mapped based on a first sequence that is generated through use of the bandwidth of the CC of the first region and a cell ID of a cell where the CC of the first region is included; and the reference signal included in a bandwidth of the second region is mapped based on a second sequence that is generated through use of a value calculated from the bandwidth of the second region and a value obtained by adding a predetermined offset to the cell ID of the CC of the first region.

20. The method as claimed in claim 19, wherein the information associated with the second region is included in a control region or control information of the CC of the first region as an indicator.

21. The method as claimed in claim 20, wherein the control information is received through a physical downlink control channel (PDCCH); and the method further comprises receiving an assignment of the second region to be contiguous to the first region so as to perform transmission and reception of data with the BS when a carrier indicator (CI) is included in a downlink control information (DCI) format of the PDCCH.

22. The method as claimed in claim 20, wherein the control information is received through a physical downlink control channel (PDCCH), and configuration information associated with the second region is included in a carrier indicator (CI) of a downlink control information (DCI) format of the PDCCH; and the method further comprises receiving assignment of the second region based on information associated with a number of second regions and a structure of the second region, included in the CI.

23. The method as claimed in claim 19, wherein the reference signal is assigned based on a sequence that is generated through use of a total length of the CC of the first region and the second region, and a cell identifier (ID) of the CC of the first region.

24. The method as claimed in claim 19, wherein a length N of the first sequence is determined based on the bandwidth of the CC of the first region, and a length M of the second sequence is determined based on the bandwidth of the second region.

* * * * *